(12) United States Patent
Telfer et al.

(10) Patent No.: US 10,372,008 B2
(45) Date of Patent: Aug. 6, 2019

(54) ELECTRO-OPTIC DISPLAYS

(75) Inventors: Stephen J. Telfer, Arlington, MA (US); Richard J. Paolini, Jr., Framingham, MA (US); Michael D. McCreary, Acton, MA (US); David John Cole, Medway, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 13/475,193

(22) Filed: May 18, 2012

(65) Prior Publication Data

US 2012/0293858 A1 Nov. 22, 2012

Related U.S. Application Data

(60) Provisional application No. 61/488,736, filed on May 21, 2011.

(51) Int. Cl.
*G02F 1/167* (2019.01)
*G02F 1/19* (2019.01)

(52) U.S. Cl.
CPC ........ *G02F 1/167* (2013.01); *G02F 2201/343* (2013.01)

(58) Field of Classification Search
CPC . G02F 1/15; G02F 1/153; G02F 1/167; G02F 2201/343; G02B 26/00; G02B 26/08; G09G 1/14; G09G 3/34; G09G 3/38
USPC ....... 359/265, 267, 273, 290–292, 295, 296, 359/298; 345/24, 84, 105, 107
See application file for complete search history.

(56) References Cited

U.S. PATENT DOCUMENTS

| | | |
|---|---|---|
| 4,418,346 A | 11/1983 | Batchelder |
| 5,760,761 A | 6/1998 | Sheridon |
| 5,777,782 A | 7/1998 | Sheridon |
| 5,808,783 A | 9/1998 | Crowley |
| 5,835,255 A | 11/1998 | Miles |
| 5,872,552 A | 2/1999 | Gordon, II et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |

(Continued)

FOREIGN PATENT DOCUMENTS

CN 103688212 B 3/2014

OTHER PUBLICATIONS

Bach, U., et al., "Nanomaterials-Based Electrochromics for Paper-Quality Displays", Adv. Mater, 14(11), 845 (2002).

(Continued)

*Primary Examiner* — Jie Lei
(74) *Attorney, Agent, or Firm* — Zhen Bao

(57) ABSTRACT

A wavelength selective reflection display (10) comprises a wavelength selective reflection medium (20) and a backing member (30) having a first, non-reflective optical state, and a second, reflective optical state. Both the wavelength selective reflection medium (20) and the backing member (30) are divided into pixels (40, 50, 60), and the backing member (30) is switchable between its first and second optical states on a pixel-by-pixel basis. The pixels of the backing member (30) are substantially aligned with those of the wavelength selective reflection medium (20).

12 Claims, 3 Drawing Sheets

(56) References Cited

U.S. PATENT DOCUMENTS

| | | | |
|---|---|---|---|
| 6,147,791 A | 11/2000 | Sheridon | |
| 6,172,798 B1 | 1/2001 | Albert et al. | |
| 6,184,856 B1* | 2/2001 | Gordon et al. | 345/107 |
| 6,225,971 B1 | 5/2001 | Gordon, II et al. | |
| 6,271,823 B1 | 8/2001 | Gordon, II et al. | |
| 6,301,038 B1 | 10/2001 | Fitzmaurice et al. | |
| 6,672,921 B1 | 1/2004 | Liang et al. | |
| 6,788,449 B2 | 9/2004 | Liang et al. | |
| 6,866,760 B2 | 3/2005 | Paolini, Jr. et al. | |
| 6,870,657 B1 | 3/2005 | Fitzmaurice et al. | |
| 6,922,276 B2 | 7/2005 | Zhang et al. | |
| 6,950,220 B2 | 9/2005 | Abramson et al. | |
| 6,982,178 B2 | 1/2006 | LeCain et al. | |
| 7,002,728 B2 | 2/2006 | Pullen et al. | |
| 7,012,600 B2 | 3/2006 | Zehner et al. | |
| 7,075,502 B1 | 7/2006 | Drzaic et al. | |
| 7,116,318 B2 | 10/2006 | Amundson et al. | |
| 7,170,670 B2 | 1/2007 | Webber | |
| 7,236,291 B2 | 6/2007 | Kaga et al. | |
| 7,259,744 B2 | 8/2007 | Arango et al. | |
| 7,321,459 B2 | 1/2008 | Masuda et al. | |
| 7,339,715 B2 | 3/2008 | Webber et al. | |
| 7,364,673 B2 | 4/2008 | Arsenault et al. | |
| 7,411,719 B2 | 8/2008 | Paolini, Jr. et al. | |
| 7,420,549 B2 | 9/2008 | Jacobson et al. | |
| 7,453,445 B2 | 11/2008 | Amundson | |
| 7,535,624 B2 | 5/2009 | Amundson et al. | |
| 7,616,673 B2 | 11/2009 | Matsuoka et al. | |
| 7,633,581 B2* | 12/2009 | Sikharulidze | 349/115 |
| 7,679,814 B2 | 3/2010 | Paolini et al. | |
| 7,688,378 B2 | 3/2010 | Mouli | |
| 7,826,131 B2 | 11/2010 | Arsenault et al. | |
| 7,839,564 B2 | 11/2010 | Whitesides et al. | |
| 2007/0109219 A1* | 5/2007 | Whitesides et al. | 345/55 |
| 2009/0284696 A1 | 11/2009 | Cheong et al. | |
| 2011/0032595 A1 | 2/2011 | Whitesides et al. | |
| 2012/0113156 A1* | 5/2012 | Lim et al. | 345/690 |

OTHER PUBLICATIONS

Hayes, R.A., et al., "Video-Speed Electronic Paper Based on Electrowetting", Nature, vol. 425, Sep. 25, pp. 383-385 (2003).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Korean Intellectual Property Office; PCT/US2012/038388; International Search Report and Written Opinion; dated Nov. 29, 2012. Nov. 29, 2012.

* cited by examiner

ELECTRO-OPTIC DISPLAYS

BACKGROUND OF INVENTION

This invention relates to electro-optic displays. More specifically, this invention relates to reflective displays based upon electrically-addressable, color-selective media.

There have recently been developed displays that selectively reflect different colors in response to an applied electric field, and which do so not by relying on the use of conventional optical absorbers such as dyes or pigments but by exploiting optical effects such as interference and diffraction. Thus, for example, IMOD (interferometric modulator display) devices in which the spacing between a mirror and a partial reflector is controlled in response to an applied field may be constructed such that only certain wavelengths are strongly reflected, depending upon the relationship between the spacing and the wavelength of the light, as described for example in U.S. Pat. No. 5,835,255. More recently, synthetic photonic crystals have been developed whose refractive index varies periodically on a length scale comparable to the wavelength of visible light. Such materials behave similarly to minerals such as opals, in which Bragg diffraction causes certain wavelengths of light to be strongly reflected from the surface of the material while other wavelengths are transmitted through the structure. Which wavelengths are transmitted and which are reflected depends upon the lattice spacing of the photonic crystal. As described for example in U.S. Pat. Nos. 7,364,673, 7,616, 376 and 7,826,131, photonic crystals may be made by colloidal self-assembly of for example silica particles, and such particles may be incorporated with a binder that fills the void space between the particles. If this binder material undergoes a dimensional change in response to, for example, an electrochemical reaction or other electro-activated process, the spacing between the silica particles is changed and the wavelength of light that is reflected is changed also. The wider the spacing between the particles, the longer the wavelength of light that is reflected. Devices have been built in which light from blue to near infra-red wavelengths may be selectively reflected. Such displays may hereinafter for convenience be referred to as "wavelength selective reflection" or "WSR" displays, and the medium used may be referred to as a "WSR medium".

Light that is not reflected by the WSR medium is transmitted through the medium, and is typically absorbed by a dark surface provided on the opposed side of the medium from the viewing surface of the display (the surface through which an observer views the display). (It is not desirable that light which has passed through the WSR medium be reflected back through this medium since this will reduce the desired selective reflection brought about by the WSR medium, i.e., such reflection will tend to "muddy" the colors exhibited by the display.

Such WSR displays can typically achieve a good dark (black) state by moving the wavelength of maximum reflection into a range invisible to the human eye, such as the near-ultra-violet or the near-infra red, so that the WSR medium appears transparent to the human eye, which simply sees the dark backing surface. (All of the color changes in WSR displays are of course conducted on a pixel-by-pixel basis using techniques such as active matrix backplanes which will be familiar to those skilled in the technology of electro-optic displays.) Although WSR displays may be used to generate particular colors, corresponding to the optical band gap of the device, there has hitherto been no convenient way to reflect white light. The closest approximation to white pixels hitherto possible is a "process white" (somewhat analogous to the process black used in cyan-magenta-yellow printing systems), as shown in FIG. 1 of the accompanying drawings, in which there is a juxtaposition of red-reflecting, green-reflecting and blue-reflecting pixels on a black background. However, such a process white state only reflects one third of incident light, and therefore cannot produce a true white state.

Accordingly, there is a need for providing WSR displays with an improved white state, and this invention seeks to meet this need.

SUMMARY OF INVENTION

Accordingly, in one aspect this invention provides a wavelength selective reflection (WSR) display comprising a WSR medium having a plurality of pixels and, disposed adjacent the WSR medium, a backing member having a plurality of pixels and having a first, non-reflective optical state, and a second, reflective optical state. The backing member is switchable between its first and second optical states on a pixel-by-pixel basis, and the pixels of the backing member are substantially aligned with the pixels of the WSR medium. (In saying that the pixels of the backing member are substantially aligned with the pixels of the WSR medium, we do not exclude the possibility that multiple pixels in one of the two layers may be aligned with a single pixel in the other layer. In particular, if the backing member is of a type which can only assume first and second optical states and not intermediate states, it may be advantageous to provide multiple pixels of the backing member adjacent each pixel of the WSR medium so that areal modulation of the backing member can be used to generate intermediate gray levels of the WSR medium.)

In addition to its first and second optical states, the backing member may have one or more intermediate gray levels having reflectivity intermediate the first and second optical states.

In saying that the backing member used in the display of the present invention has a first, non-reflective optical state, and a second, reflective optical state (and one or more intermediate gray levels, if present), it is not intended to exclude the possibility that the backing member might itself be a composite member. For example, the backing member may comprise a variable medium having a reflective state and a substantially light-transmissive state, in combination with a non-varying dark surface disposed on the opposed side of this variable medium from the WSR medium, so that the reflective state of the backing member is provided by setting the variable medium to its reflective state, while the non-reflective state of the backing member is provided by setting the variable medium to its light-transmissive state, thus allowing light passing through the WSR medium to be absorbed by the dark surface disposed behind the variable medium. Conversely, of course, the backing member may comprise a variable medium having a non-reflective (light-absorbing) state and a substantially light-transmissive state (and optionally various intermediate states in which the light is partially absorbed and partially transmitted), in combination with a non-varying reflective surface disposed on the opposed side of this variable medium from the WSR medium, so that the non-reflective state of the backing member is provided by setting the variable medium to its non-reflective state, while the reflective state of the backing member is provided by setting the variable medium to its light-transmissive state, thus allowing light passing through the WSR medium to be reflected by the white surface disposed behind the variable medium.

Furthermore, variable media are known which have reflective, non-reflective (light-absorbing) and light-transmissive states; see, for example, U.S. Pat. No. 7,259,744, which describes an encapsulated dielectrophoretic medium containing white and black pigments bearing charge of opposite polarity, and having at least three different optical states, namely a reflective state in which the white pigment faces an observer, a non-reflective state in which the black pigment faces the observer, and a light-transmissive state in which both the black and white pigments are moved adjacent the sidewalls of the capsules. If such a three-state variable medium is used in the backing member of a WSR display of the present invention, a light source may be placed behind the three-state variable medium (i.e., on the opposed side of the variable medium from the WSR medium) to produce a "dual-mode" WSR display which can function in either its normal reflective mode (in which case the light source would normally be turned off to conserve power) or in a backlit, transmissive mode, with the light source turned on and the three-state variable medium in its light-transmissive mode. Although the colors generated by a WSR medium in transmission are different from those generated in reflection (the colors in transmission will be complementary to those generated in reflection), and hence the drive scheme for the display will be different in transmission from in reflection, this is not likely to be a major problem, since the user will normally only switch between the reflective and backlit modes at long intervals depending upon the level of ambient light, so there will be plenty of time for the display to shift drive modes. However, it must be recognized that in the transmission drive scheme it will not be possible to produce fully saturated versions of the colors generated in reflection. For example, it the WSR medium generates red, green and blue colors in reflection, it will generate cyan, magenta and yellow colors in transmission. To generate (for example) a red color in transmission, it will be necessary to place a yellow pixel adjacent a magenta pixel, but the combination of yellow and magenta pixels is equivalent to a red pixel plus a white pixel, so that the perceived color will be an unsaturated red.

As an alternative to a backlight or in addition thereto, the WSR display of the present invention may be fitted with a front light arranged to illuminate the viewing surface of the WSR medium. Since WSR media tend to produce colors which are dependent upon viewing angle, it is desirable that such a front light be arranged to project at least the major portion of its light perpendicular to the viewing surface of the WSR medium.

BRIEF DESCRIPTION OF DRAWINGS

As already mentioned, FIG. 1 of the accompanying drawings is a schematic cross-section through a prior art WSR display illustrating the principle of operation of the display.

DETAILED DESCRIPTION

Figure 1:
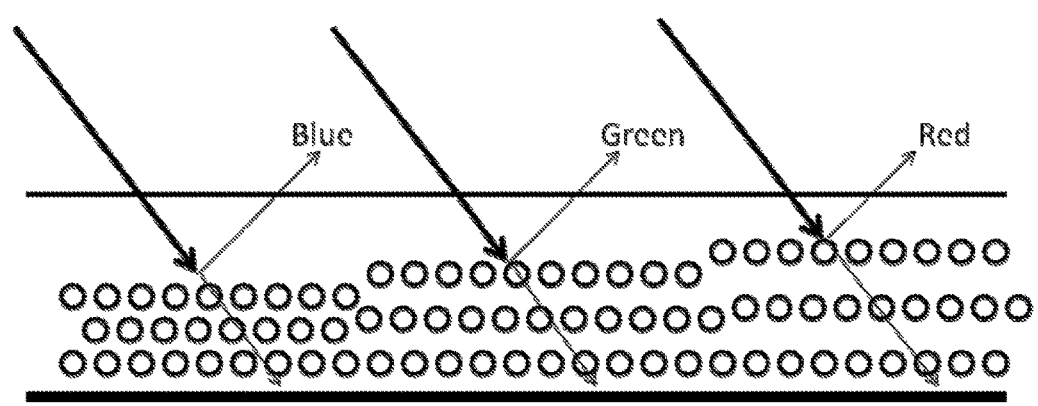

As indicated above, the present invention provides a WSR display comprising a WSR medium and, disposed adjacent the WSR medium, a backing member having a first, non-reflective optical state, and a second, reflective optical state. The backing member is switchable between its first and second optical states on a pixel-by-pixel basis, the pixels of the backing member being substantially aligned with the pixels of the WSR medium.

In principle, the backing member used in the present display can be any member have non-reflective and reflective states. For example, in very large (billboard size) displays having pixels of the order of centimeters square, the backing member may be, for example, a mechanical shutter; such a shutter could have a plurality of vanes which can be rotated between a closed position in which they lie parallel to the plane of the layer of the WSR medium and present a reflective surface towards the layer of WSR medium, and an open position, in which they lie perpendicular to the plane of the layer of WSR medium and allow light passing through the WSR medium to be absorbed by a dark surface provided behind the vanes. However, in general it is preferred that the backing member be a layer of electro-optic material capable of being switched between a reflective state and a non-reflective or transmissive optical state.

Numerous types of electro-optic material can be used for this purpose. One type of electro-optic material is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

(The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.)

Another type of electro-optic material uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic material is an electro-wetting medium developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

Another type of electro-optic material, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Films and sub-assemblies containing electro-optic materials; see for example U.S. Pat. Nos. 6,982,178 and 7,839,564;
(d) Backplanes, adhesive layers and other auxiliary layers and methods used in displays; see for example U.S. Pat. Nos. 7,116,318 and 7,535,624;
(e) Color formation and color adjustment; see for example U.S. Pat. No. 7,075,502 and U.S. Patent Application Publication No. 2007/0109219; and
(f) Methods for driving displays; see for example U.S. Pat. Nos. 7,012,600 and 7,453,445.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc. Hereinafter, the term "microcavity electrophoretic display" may be used to cover both encapsulated and microcell electrophoretic displays.

As already noted, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic material typically does not suffer from the clustering and settling failure mode of traditional electrophoretic devices and provides further advantages, such as the ability to print or coat the material on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the material can be printed (using a variety of methods), the backing member required by the present invention can be made inexpensively.

Other types of electro-optic materials may also be used in the backing members required by the present invention. Of particular interest, bistable ferroelectric liquid crystal displays (FLC's) are known in the art.

It will be appreciated that, in the display of the present invention, the WSR medium and the backing member must be independently controllable, so that when the backing member comprises an electro-optic material, it might at first glance appear that the display requires four electrodes or sets of electrodes, one pair for each of the WSR medium and the backing member. If, however, as will often be the case, both the WSR medium and the backing member are to be controlled using an active matrix backplane on one side of the medium and a single continuous electrode on the opposed side of the medium, the number of electrodes can be reduced by placing a single continuous electrode between the WSR medium and the backing member, and placing the active matrix backplanes on the front surface of the WSR medium (adjacent the viewing surface of the display) and behind the backing member. This not only simplifies construction of the display and thus reduces cost, but also reduces the number of electrodes through which light must pass when the display is being used with the backing member in its reflective mode; since the reflective surface of an electro-optic material used as the backing member lies between the two electrodes associated with this backing member, light entering from the viewing surface must pass through both electrodes associated with the WSR medium, through the front electrode associated with the electro-optic medium, and back through the same electrodes. If the WSR medium and electro-optic medium use separate sets of electrodes, this requires light to pass through six electrodes, each of which necessarily causes some light absorption and/or scattering. Providing a single common electrode between the WSR medium and the electro-optic medium reduces the number of electrodes which the light has to traverse to four, with consequent reduced light scattering and/or absorption.

It is desirable that any electro-optic material used in the backing member be bistable in order to reduce the energy consumption of the display. Although the backing member may have to be rewritten whenever the WSR medium is rewritten, in practice there are often substantial intervals between successive rewritings of the image on the WSR medium, so a bistable backing member can make a significant difference in the overall energy consumption of the display of the present invention.

When the display of the present invention incorporates a backlight, this light may be of any of the types previously used for backlighting electro-optic displays. For example, the backlight could be a fluorescent lamp, especially a cold cathode fluorescent lamp, or a light emitting diode array.

Figure 2:
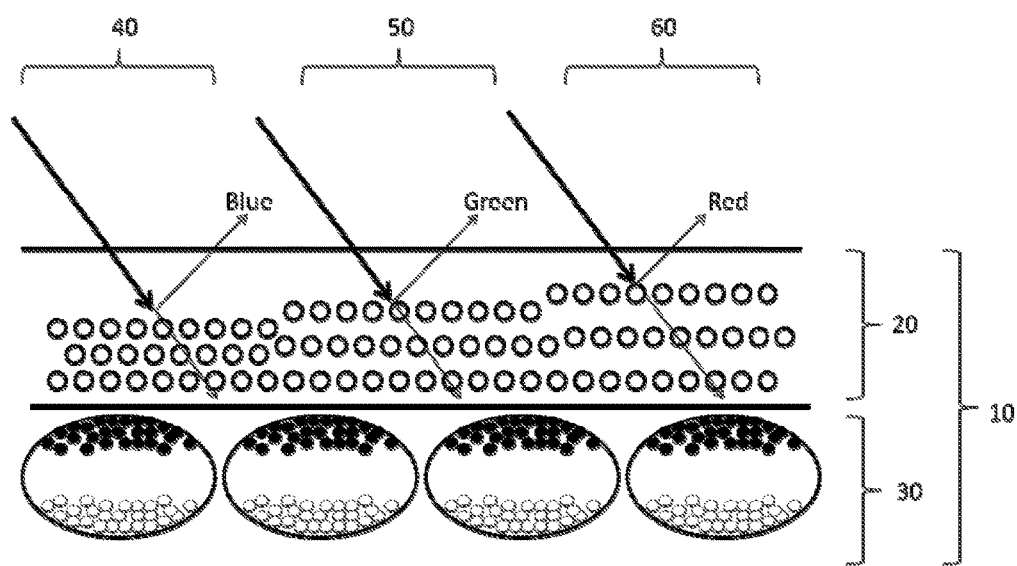
FIG. 2 is a schematic cross-section, similar to that of FIG. 1, through a WSR display of the present invention in which the backing member comprises a dual particle encapsulated electrophoretic medium, which in FIG. 2 is in its non-reflective state.

FIG. 2 of the accompanying drawings illustrates a display 10 of the present invention in which a WSR medium (an electrically-addressable photonic crystal 20) is superposed on a second electro-optic layer 30 (illustrated as an encapsulated electrophoretic material) which can be electrically addressed to produce a dark, absorbing state (as shown in FIG. 2) or a white, reflecting state (as shown in FIG. 2). Materials other than photonic crystal materials and electrophoretic materials may be used in the present display. For example, WSR layer 20 could alternatively be a MEMS device and display layer 30 could alternatively be an electrowetting, reflective liquid crystal, another MEMS device or even another photonic crystal layer that reflects light of wavelengths that are transmitted by the first photonic crystal layer. Both layers 10 and 20 may be pixelated and in the case that both are pixelated it is preferred that the pixels of the two layers 20 be in registration with each other. Both layers, when pixelated, may be associated with a matrix addressing scheme that may be active or passive.

FIG. 2 shows three pixels, 40, 50 and 60 in which the photonic crystal layer 20 has been switched so as to reflect blue, green and red light respectively. In pixel 40 light that is green and red is transmitted; in pixel 50 light that is blue and red is transmitted; and in pixel 60 light that is blue and green is transmitted. As shown in FIG. 2 the 30 is in its dark state, such that all the light transmitted in pixels 40, 50 and 60 is absorbed and the pixels 40, 50 and 60 appear to the viewer to be blue, green and red. Each pixel 40, 50 or 60 can be switched to any color, however, by changing the spacing of the photonic crystal material appropriately. Any of pixels 40, 50 and 60 could be made non-reflective by spacing the photonic crystal material so as to reflect in the near UV or the near-IR, as mentioned above, in which case all incident visible light would pass through layer 20 and be absorbed in layer 30.

Figure 3:
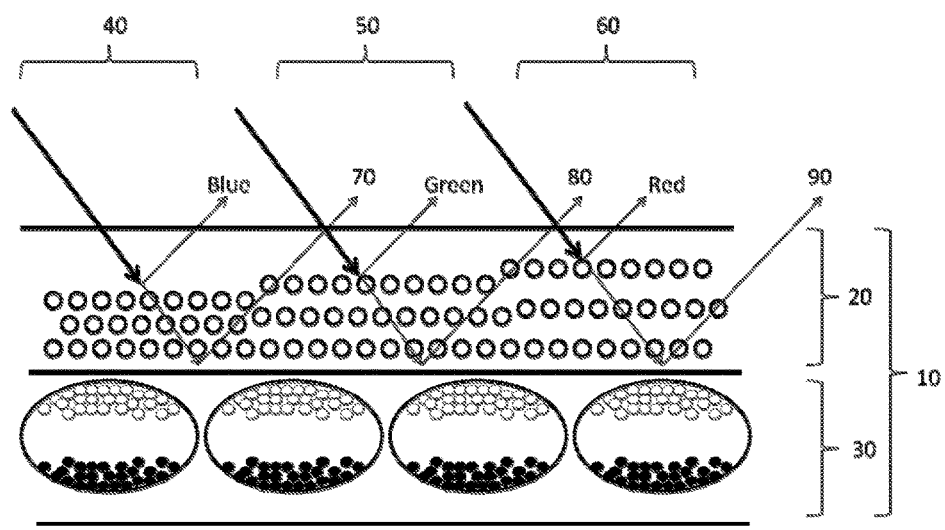
FIG. 3 is a schematic cross-section of the display shown in FIG. 2 showing the backing member in its reflective state.

The white state of display 10 is achieved as shown in FIG. 3, in which switchable reflective layer 30 is in the bright, white state and all the light that is transmitted through pixels 40, 50 and 60 in layer 20 is reflected, as indicated by arrows 70, 80 and 90. Thus, no matter what the state of the photonic crystal layer 20, substantially all the incident light is reflected by the display, which consequently appears white.

It is possible for switchable layer 30 to be addressed on a pixel-wise basis while photonic crystal layer 20 is not. For example, photonic crystal layer 20 might be a pattern of pixels which comprise differently-sized particles (appropriately spaced to reflect red, green and blue light) printed or otherwise deposited to as to form a color filter array on top of switchable reflective layer 30. Optionally, photonic crystal layer 20 could be globally addressed to move the reflections of each color into the near-UV or near-IR region, and thus switch off the color filter array.

Figure 4:
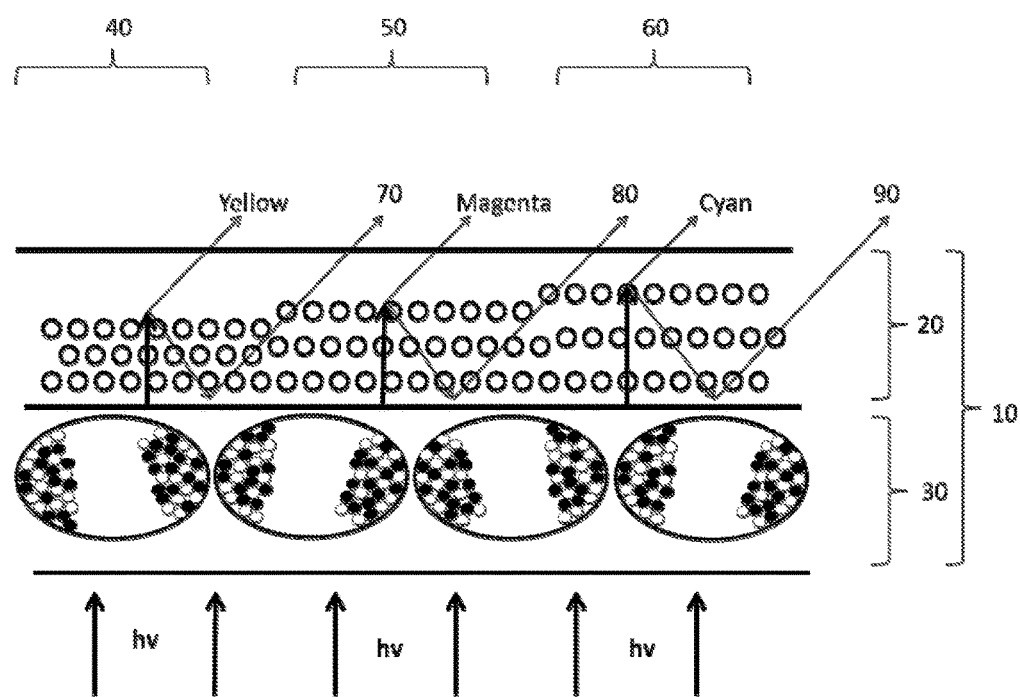
FIG. 4 is a schematic cross-section of the display shown in FIG. 2 showing the backing member in its transmissive state.

FIG. 4 illustrates the display 10 operating in a backlit mode. In this mode, the pigment particles in the capsules of layer 30 are moved laterally to be in contact with the sidewalls of the capsules, so that a major proportion of the area of each capsule is free from pigment. (The proportion of pigment in the capsules is exaggerated in FIGS. 2-4 for purposes of illustration, and in practice the pigment particles occupy a much smaller proportion of the capsule area than is shown in FIG. 4. Also, in practice the capsules are closer in form to polyhedra than the oblate ellipsoids illustrated in FIGS. 2-4, which further reduces the proportion of the capsule area occupied by the pigment particles.) White light from a light source passes through the layer 30 with little obstruction and is subject to wavelength selective reflection by the pixels 40, 50 and 60. However, the wavelength selective reflection is now acting in a subtractive mode (i.e., is removing certain colors selectively from the white light passing the layer 30), so that the pixel 40 appears yellow, the pixel 50 appears magenta and the pixel 60 appears cyan.

From the foregoing, it will be seen that the present invention can provide a wavelength selective reflection display capable of displaying good black and white colors. The present invention also allows such a display to be backlit for use in low light environments.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A wavelength selective reflection (WSR) display comprising a wavelength selective reflection medium capable of undergoing a dimensional change in response to an electro-activated process so as to reflect any color of light, the wavelength selective reflection medium having a plurality of pixels and, disposed adjacent the wavelength selective reflection medium, a backing member having a plurality of pixels and having a first, non-reflective optical state, and a second, reflective optical state, the backing member being switchable between its first and second optical states on a pixel-by-pixel basis, the pixels of the backing member being substantially aligned with the pixels of the wavelength selective reflection medium, wherein the backing member is placed on the opposed side of the wavelength selective reflection medium from the viewer, and comprises a layer of electro-optic material capable of being switched between a reflective state and a non-reflective state, or a reflective state and a transmissive optical state.

2. A WSR display according to claim 1 wherein the backing member has at least one intermediate gray level having a reflectivity intermediate its first and second optical states.

3. A WSR display according to claim 1 wherein the backing member comprises a variable medium having a reflective state and a substantially light-transmissive state, and a non-varying dark surface disposed on the opposed side of the variable medium from the WSR medium.

4. A WSR display according to claim 1 wherein the backing member comprises a variable medium having a non-reflective state and a substantially light-transmissive state, and a non-varying reflective surface disposed on the opposed side of the variable medium from the WSR medium.

5. A WSR display according to claim 1 wherein the backing member comprises a variable medium having reflective, non-reflective and light-transmissive states.

6. A WSR display according to claim 5 further comprising a light source disposed on the opposed side of the variable medium from the WSR medium.

7. A WSR display according to claim 1 wherein the electro-optic material comprises a rotating bichromal member, electrochromic or electro-wetting material.

8. A WSR display according to claim 1 wherein the electro-optic material comprises an electrophoretic material comprising a plurality of electrically charged particles disposed in a fluid and capable of moving through the fluid under the influence of an electric field.

9. A WSR display according to claim 8 wherein the electrically charged particles and the fluid are confined within a plurality of capsules or microcells.

10. A WSR display according to claim 8 wherein the electrically charged particles and the fluid are present as a plurality of discrete droplets surrounded by a continuous phase comprising a polymeric material.

11. A WSR display according to claim 8 wherein the fluid is gaseous.

12. A WSR display according to claim 1 wherein the WSR medium is an electrically-addressable photonic crystal.

* * * * *